United States Patent
Takahashi et al.

[11] Patent Number: 6,057,263
[45] Date of Patent: May 2, 2000

[54] METALLIC CATALYST CARRIER

[75] Inventors: Hideaki Takahashi; Kimiyoshi Nishizawa, both of Yokohama, Japan

[73] Assignee: Nissan Motor Co., Ltd., Yokohama, Japan

[21] Appl. No.: 09/032,925

[22] Filed: Mar. 2, 1998

[30] Foreign Application Priority Data

Mar. 3, 1997 [JP] Japan ................................ 9-047831

[51] Int. Cl.$^7$ ................ B01J 21/04; B01J 8/02; B01D 50/00
[52] U.S. Cl. ............... 502/439; 502/527.14; 502/527.15; 502/527.19; 502/527.22; 502/527.23; 502/527.24; 422/171; 422/177; 422/180; 422/222
[58] Field of Search .................. 502/439, 527.14, 502/527.15, 527.19, 527.22, 527.23, 527.24; 422/171, 177, 180, 222

[56] References Cited

U.S. PATENT DOCUMENTS

| | | | |
|---|---|---|---|
| 4,273,681 | 6/1981 | Nonnemann | 252/472 |
| 4,416,800 | 11/1983 | Abe et al. | 502/159 |
| 4,647,435 | 3/1987 | Nonnenmann | 422/180 |
| 5,328,774 | 7/1994 | Maus et al. | 428/593 |
| 5,460,790 | 10/1995 | Shustorovich et al. | 422/177 |
| 5,591,413 | 1/1997 | Toyoda | 422/180 |
| 5,612,277 | 3/1997 | Harkonen et al. | 502/325 |
| 5,620,666 | 4/1997 | Usui | 422/171 |
| 5,658,536 | 8/1997 | Okabe et al. | 422/180 |
| 5,729,902 | 3/1998 | Wieres et al. | 29/890 |
| 5,791,044 | 8/1998 | Whittenberger et al. | 29/890 |

FOREIGN PATENT DOCUMENTS

| | | |
|---|---|---|
| 29 02 779 | 7/1980 | Germany . |
| 40 24 942 | 2/1992 | Germany . |
| 40 25 434 | 2/1992 | Germany . |
| 2 040 179 | 8/1980 | United Kingdom . |
| WO 89/02978 | 4/1982 | WIPO . |
| WO 96/26354 | 8/1996 | WIPO . |
| WO 97/45200 | 12/1997 | WIPO . |

*Primary Examiner*—Elizabeth Wood
*Assistant Examiner*—Patricia L. Hailey
*Attorney, Agent, or Firm*—Foley & Lardner

[57] ABSTRACT

A metallic catalyst carrier forming part of a catalytic converter for purifying exhaust gas discharged from an internal combustion engine of an automotive vehicle. The metallic catalyst carrier comprises a plurality of layers of corrugated metal sheet which has a plurality of corrugations whose ridge portions are parallel with each other and extend in a direction of flow of gas to be purified, and a plurality of layers of flat metal sheet which is substantially flat. Each layer of the flat metal sheet and each layer of the corrugated metal sheet are alternately put one upon another so as to form the metallic catalyst carrier of a monolithic structure in which gas passages are defined between each layer of the flat metal sheet and each layer of the corrugated sheet, the gas flowing through the gas passages in the gas flow direction. Additionally, the metallic catalyst carrier of the monolithic structure has a gas inlet section through which the gas is introduced, a gas outlet section through which the gas is discharged, and an intermediate section located between the gas inlet section and the gas outlet section in the gas flow direction. The intermediate section includes only either one of the layers of the flat metal sheet and the layers of the corrugated metal sheet so as to be free from the other. The gas passages of the gas outlet section are higher in cross-sectional density than those of the gas inlet section.

4 Claims, 12 Drawing Sheets

METALLIC CATALYST CARRIER

The contents of Japanese Patent Application No. 9-47831, with a filing date of Mar. 3, 1997 in Japan, are hereby incorporated by reference.

BACKGROUND OF THE INVENTION

1. Field of the Invention

This invention relates to improvements in a metallic catalyst carrier of a catalytic converter or the like which is disposed in an exhaust passage of an internal combustion engine in order to purify exhaust gas discharged from the engine, and more particularly to the improvements for achieving early activation of the catalyst carried on the catalyst carrier and raising a conversion efficiency of the catalyst.

2. Description of the Prior Art

Hitherto a catalytic converter including a metallic catalyst carrier encased in a shell has been used upon being disposed in an exhaust gas passage of an internal combustion engine in order to purify exhaust gas discharged from the engine, i.e., to convert noxious exhaust gas components such as CO, HC, NOx and the like into harmless gas. The metallic catalyst carrier carries thereon a catalyst meterial to form a catalytic element. An example of such a metallic catalyst carrier is constituted of a plurality of corrugated metal sheets and a plurality of flat metal sheets and produced by alternately putting each corrugated metal sheet and each plate metal sheet one upon another, as disclosed in an International Publication No. WO 97/45200.

In such a metallic catalyst carrier, each corrugated metal sheet has a section which is located between gas inlet and outlet sections and has corrugations smaller than normal corrugations thereby reducing contact portions between the corrugated and flat metal sheets. This is intended to enlarge the surface area of the catalyst carrier and therefore increases the surface area of the catalyst material to be exposed to exhaust gas, thus improving a conversion efficiency for the noxious gas after warning-up of the engine.

Now, in order to effectively convert the noxious exhaust gas components such as CO, HC, NOx and the like into harmless gas, it is essential to promptly activate the catalyst material during engine warming-up in addition to raise the conversion efficiency after engine warming-up. For the purpose of prompt or early activation of the catalyst, it is effective to reduce the heat mass or capacity of the gas inlet section of the catalytic element. This is because early activation of the gas inlet section of the catalytic element promotes activation of the gas outlet section of the catalytic element under the action of reaction heat generated at the gas inlet section. However, reducing the heat capacity of the gas inlet section results in reducing the heat capacity of the whole catalytic element, and therefore there arises such a problem that the conversion efficiency is unavoidably lowered after engine warming-up. In other words, with the above-discussed metallic catalyst carrier in which the surface area of the catalyst carrier is increased by reducing the contact portions between the corrugated and flat metal sheets, there exists a certain limit for raising the conversion efficiency after engine warming-up, and therefore a further improvement in conversion efficiency is required. Additionally, it is difficult to reduce the heat capacity of the metallic catalyst carrier for the purpose of intending early activation of the catalyst material.

BRIEF SUMMARY OF THE INVENTION

It is an object of the present invention to provide an improved metallic catalyst carrier of a catalytic converter, which can overcome drawbacks encountered in conventional metallic catalyst carriers of the type wherein each layer of corrugated metal sheet and each layer of flat metal sheet are alternately put one upon another.

Another object of the present invention is to provide an improved metallic catalyst carrier of a catalytic converter, which can accomplish early activation of a catalyst material carried on the carrier and a high conversion efficiency for exhaust gas noxious components after activation of the catalyst.

A further object of the present invention is to provide an improved catalyst carrier of the type constituted of a plurality of corrugated metal sheets and a plurality of flat metal sheets, which includes an intermediate section having a heat capacity lower than that of gas inlet and outlet sections of the carrier, the intermediate section being formed by removing either one of the corrugated metal sheets and the flat metal sheets.

A metallic catalyst carrier of the present invention comprises a plurality of layers of corrugated metal sheet which has a plurality of corrugations whose ridge portions are parallel with each other and extend in a direction of flow of gas to be purified, and a plurality of layers of flat metal sheet which is substantially flat. Each layer of the flat metal sheet and each layer of the corrugated metal sheet are alternately put one upon another so as to form the metallic catalyst carrier of a monolithic structure in which gas passages are defined between each layer of the flat metal sheet and each layer of the corrugated sheet, the gas flowing through the gas passages in the gas flow direction. Additionally, the metallic catalyst carrier of the monolithic structure has a gas inlet section through which the gas is introduced, a gas outlet section through which the gas is discharged, and an intermediate section located between the gas inlet section and the gas outlet section in the gas flow direction. The intermediate section includes only either one of the layers of the flat metal sheet and the layers of the corrugated metal sheet so as to be free from the other. The gas passages of the gas outlet section are higher in cross-sectional density than those of the gas inlet section.

According to the above metallic catalyst carrier, either one of the layers of the corrugated metal sheet and the layers of the flat metal sheet exists at the intermediate section, and therefore the heat capacity of the intermediate section is lowered. This lowers the heat capacity of a front-generally half section (extending from the gas inlet section to the intermediate section) of the metallic catalyst carrier thereby raising the temperature of a catalyst material carried on the front-generally half section to a level required for activation of the catalyst material for a short time, thus promoting early activation of the catalyst material. The reaction heat generated at the front-generally half section of the metallic catalyst carrier is transferred through the layers of the corrugated or flat metal sheets to the layers of the corrugated and flat metal sheets of a rear-generally half section of the metallic catalyst carrier, thereby promoting activation of the catalyst material carried on the rear-generally half section. After the catalyst material on the rear-generally half section is activated, the conversion efficiency at the rear-generally half section can be raised because exhaust gas passages in the rear-generally half section are formed to be high in cross-sectional density so as to increase the contacting area of the catalyst material to exhaust gas. Additionally, the cross-sectional shape of the metallic catalyst carrier changes in the direction of flow of exhaust gas thereby improving a dispersion characteristics of exhaust gas. This facilitates contact of exhaust gas to the catalyst material, thus further promoting purification of exhaust gas.

BRIEF DESCRIPTION OF THE DRAWINGS

In the drawings, like reference numerals designate like parts and elements throughout all the figures, in which.

DETAILED DESCRIPTION OF THE INVENTION

Figure 1:
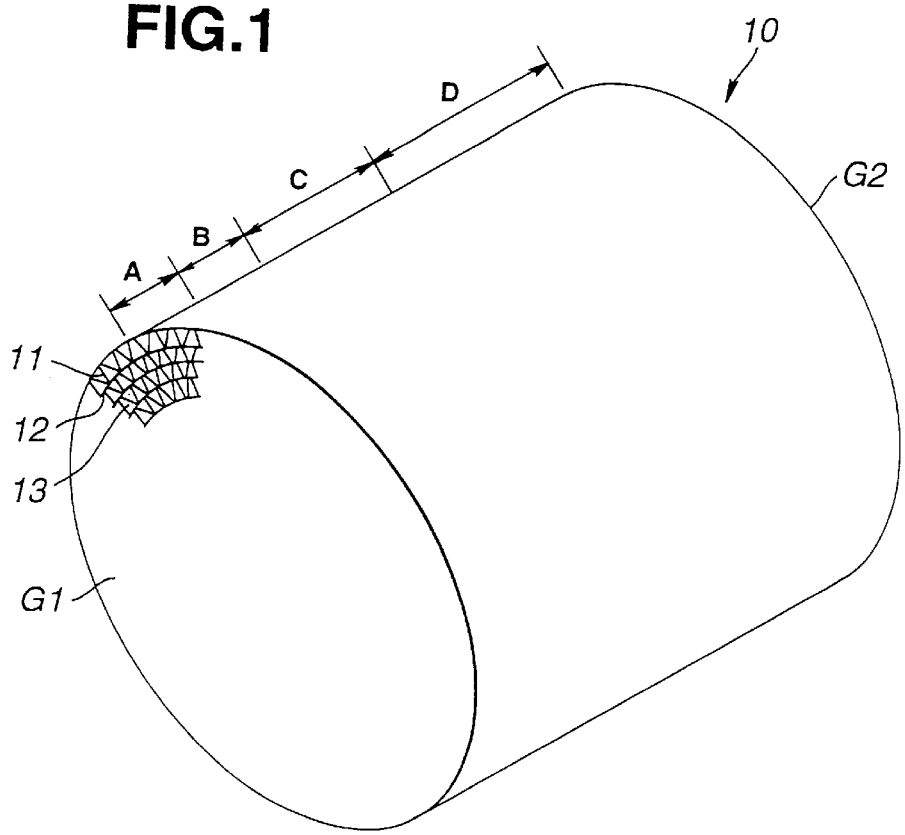
FIG. 1 is a perspective view of a first embodiment of a metallic catalyst carrier according to the present invention.

Referring now to FIGS. 1, 2 and 3A to 3D, a first embodiment of a metallic catalyst carrier of a catalytic converter, according to the present invention is illustrated by the reference numerals 10. The catalytic converter in this instance is for purifying exhaust gas discharged from an internal combustion engine of an automotive vehicle. It will be understood that a known catalyst material (not shown) is carried on the metallic catalyst carrier to form a catalytic element which is to be encased in a metallic shell (not shown), so that exhaust gas is to be in contact with the catalyst material of the catalytic element to be purified. The metallic catalyst carrier 10 is formed by putting a corrugated metal sheet 11 and a generally flat metal sheet 12 one upon another and by rolling up the sheets 11, 12 to form a generally cylindrical monolithic structure in which each of a plurality of layers of the corrugated metal sheet 11 and each of a plurality of layers of the flat metal sheet 12 are alternately put one upon another. In this cylindrical monolithic structure, spaces formed between the corrugated metal sheet 11 and the flat metal sheet 12 serve as gas passages 13 through which exhaust gas from the engine flows. The catalyst material is carried at the surfaces of the metal sheets 11, 12 defining the gas passage 13. Thus, although the metallic catalyst carrier 10 in this embodiment is actually generally cylindrical as shown in FIG. 1 so that each of the corrugated metal sheet 11 and the flat metal sheet 12 is configured generally cylindrical, the corrugated metal sheet 11 and the flat metal sheet 12 are illustrated in a fragmentary state to be horizontal and put one upon another for the purpose of simplicity of illustration, in FIGS. 2, and 3A to 3D.

It will be understood that the generally flat metal sheet 11 may be slightly waved or gently corrugated, and that the catalyst carrier 10 may be formed by merely putting a plurality of the corrugated metal sheets 11 and a plurality of the flat metal sheets 12 are put one upon another without being rolled up, in such a manner that each corrugated metal sheet 11 and each flat metal sheet 12 is located one upon another.

Figure 2:
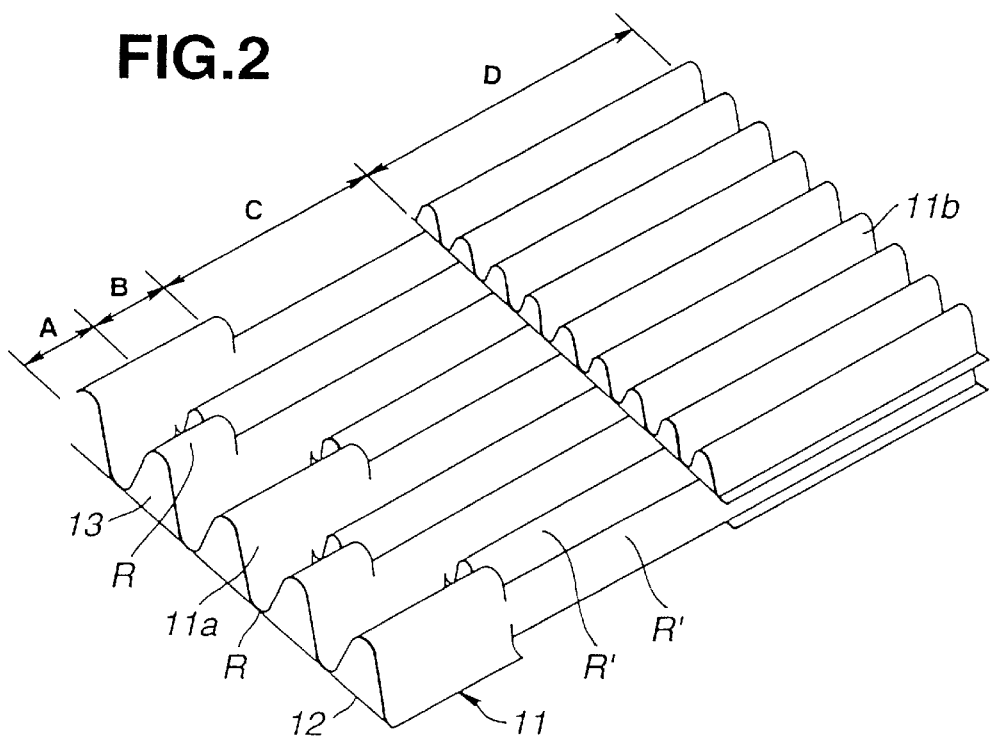
FIG. 2 is a fragmentary perspective view of the metallic catalyst carrier of FIG. 1, illustrating a state where each corrugated metal sheet and each flat metal sheet are put one upon another.

Next, the structure of the metallic catalyst carrier 10 will be discussed hereinafter. The metallic catalyst carrier 10 has regions A, B, C and D which are axially aligned in the order mentioned in a direction of flow of exhaust gas from the internal combustion engine, as shown in FIGS. 1 and 2. It will be understood that the exhaust gas is introduced through the region A and discharged through the region D, so that an exhaust gas inlet section G1 and an exhaust gas outlet section G2 respectively form part of the regions A and D.

Figure 3A:
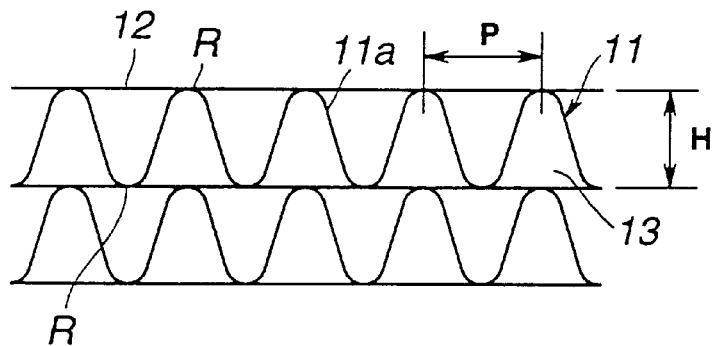
FIG. 3A is a fragmentary sectional view of a region A in the metallic catalyst carrier in FIG. 2.

At the region A, the corrugated metal sheet 11 includes normal large corrugations 11a, in which the ridge portion R of each corrugation 11a is in contact with the flat metal sheet 12, as best shown in FIG. 3A.

Figure 3B:
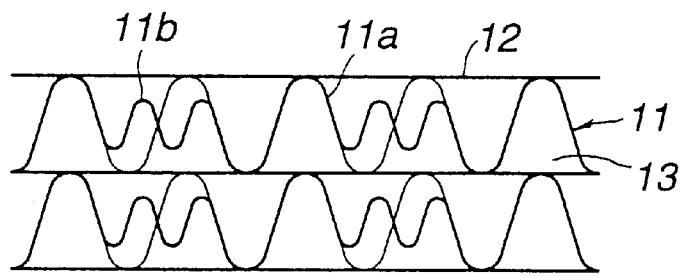
FIG. 3B is a fragmentary sectional view of a region B in the metallic catalyst carrier in FIG. 2.

At the region B, the corrugated metal sheet 11 includes the large corrugations 11a and small corrugations 11b, in which the ridge portion R of each large corrugation 11a is in contact with the flat metal sheet 12, as best shown in FIG. 3B. The two small corrugations 11b and each large corrugation 11a are formed alternately in a direction generally perpendicular to the direction of extension of the ridge portion R of each corrugation 11a, 11b, so that the two small corrugations are located between the adjacent large corrugations 11a, 11a. The small corrugations 11b have a pitch P and a height H which are respectively about ½ of those of the large corrugations 11a, so that the ridge portion R' of each small corrugation 11b is separate from the flat metal sheet 12.

Figure 3C:
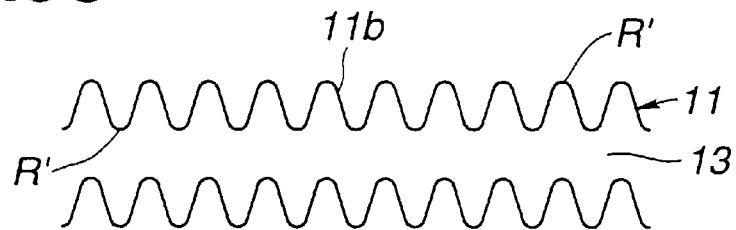
FIG. 3C is a fragmentary sectional view of a region C in the metallic catalyst carrier in FIG. 2.
Figure 3D:
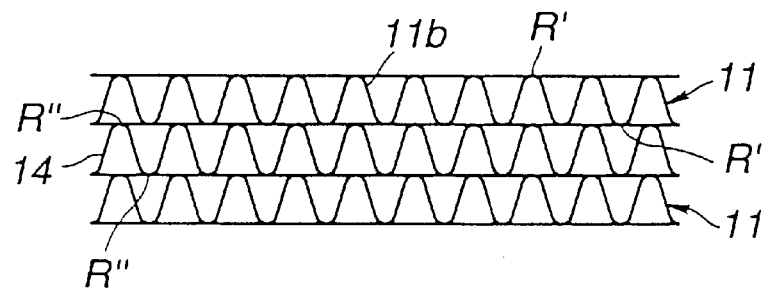
FIG. 3D is a fragmentary sectional view of a region D in the metallic catalyst carrier in FIG. 2.
Figure 3E:
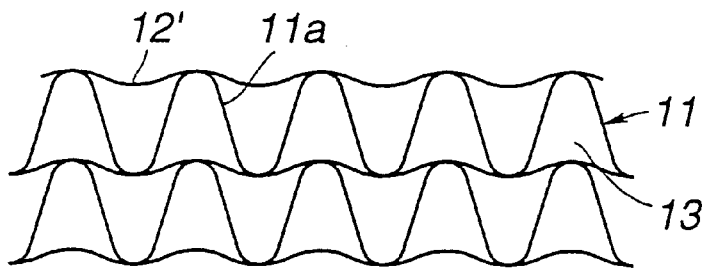
FIGS. 3E to 3H are fragmentary sectional views of a modified example of the first embodiment of FIG. 1, in which FIGS. 3E to 3H correspond respectively to FIGS. 3A to 3D of the first embodiment.
Figure 3F:
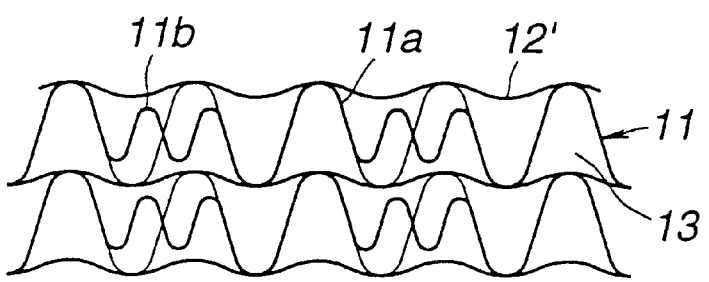
Figure 3G:
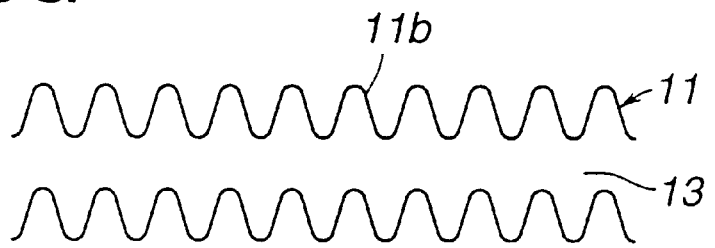
Figure 3H:
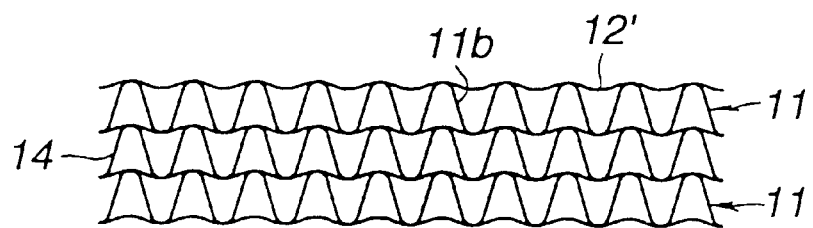

At the region C, the corrugated metal sheet 11 includes only the small corrugations 11b as shown in FIG. 3C. Additionally, at the region C, the flat metal sheets 12 are removed, so that each space formed between the adjacent corrugated metal sheets 11 serves as the gas passage 13.

At the region D, the corrugated metal sheet 11 includes the small corrugations 11b as same as at the region C. At the region D, the flat metal sheets 12 are added in such a manner as to contact with ridge portions R' of the small corrugations 11b. Furthermore, at the region D, a corrugated metal sheet 14 including only the small corrugations 11b is added between the adjacent corrugated metal sheets 11 in such a manner that its ridge portions R" is in contact with the flat metal sheets 12. Accordingly, under the effect of the small corrugations 11b having the pitch P and the height H which are respectively about ½ of those of the large corrugations 11a, a cross-sectional density of the gas passages 13 (referred hereinafter to as a "cell density") of this region D in an imaginary plane perpendicular to the corrugations 11a, 11b is about 4 times of that of the region A whose corrugated metal sheet having only the large corrugations 11a.

Figure 4A:
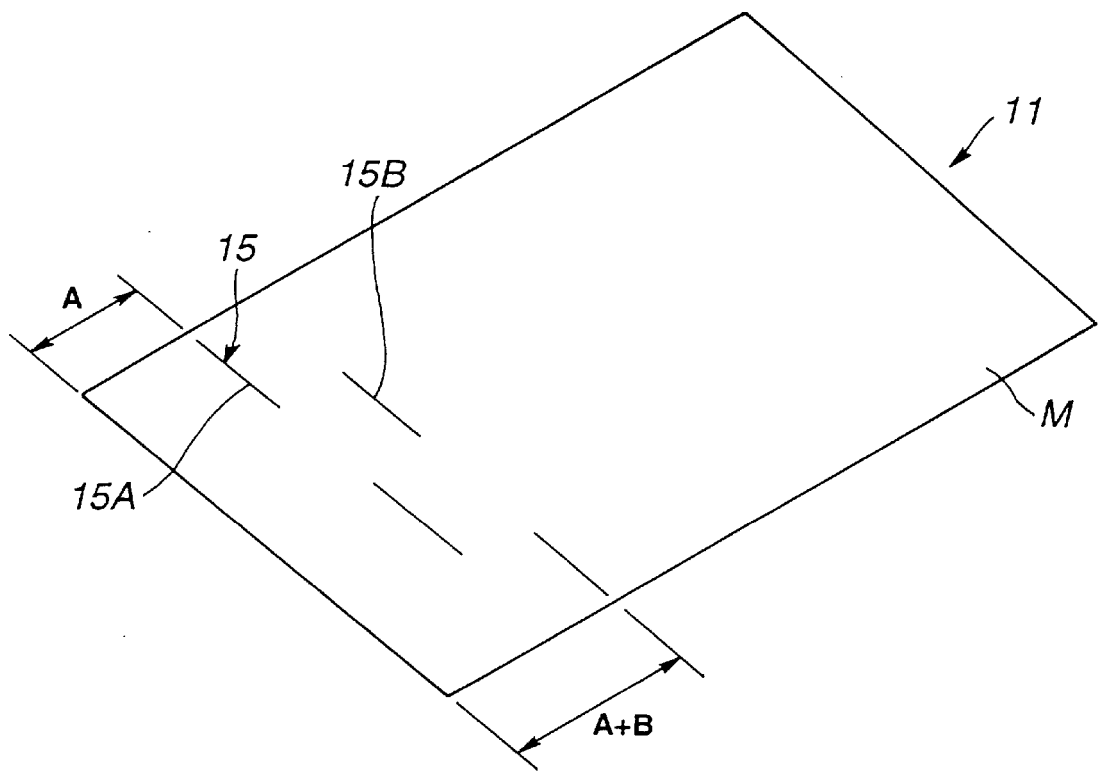
FIG. 4A is a fragmentary perspective view of a plane metal sheet material (before press-formed) for a corrugated metal sheet of the metallic catalyst carrier of FIG. 2.
Figure 4B:
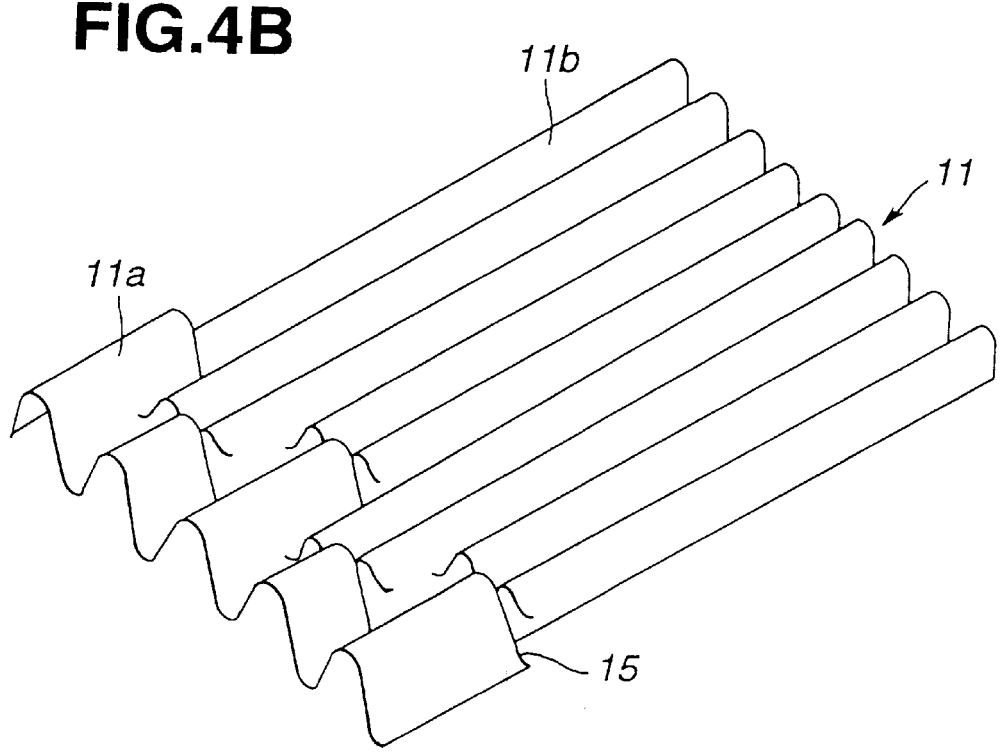
FIG. 4B is a fragmentary perspective view of the corrugated metal sheet (after press-formed) of the metallic catalyst carrier of FIG. 2.

Here, a manner of production of the corrugated metal sheet 11 of the above-mentioned structure will be discussed hereinafter with reference to FIGS. 4A and 4B.

a) Slits or cuts 15 are formed in a plate metal sheet material M at locations where the large corrugation 11a is changed into the small corrugation 11b as shown in FIG. 4A. These slits 15 includes first slits 15A and second slits 15B. Each first slit 15A is positioned at a distance A from an end edge (forming part of the exhaust gas inlet section G1) of the plane metal sheet material M. Each second slit 15B is positioned at a distance A+B from the end edge of the plane metal sheet material M. The first and second slits 15A, 15B are arranged alternately in the direction generally perpendicular to extension of each corrugation 11a, 11b.

b) The plane metal sheet material M formed with the slits 15 is subjected to press working so that the large and small corrugations 11a, 11b are formed in the sheet material M as shown in FIG. 4B. Each large corrugation 11a is formed in a portion between the end edge and each slit 15, while each small corrugation 11b is formed in a portion between each slit 15 and the other end edge (forming part of the exhaust gas outlet section G2) opposite to the above end edge. Accordingly, the region B is formed as shown in FIG. 3B.

The region B functions as follows: In case that the large corrugations 11a are intended to be abruptly changed into the small corrugations 11b, it is required to form the slits 15 throughout the whole distance of the plane metal sheet material M in the direction generally perpendicular to the extension of each corrugation 11a, 11b, which will unavoidably divide the plane metal sheet material M into two sections which are separate from each other. Accordingly, by virtue of the region B in which the large and small corrugations 11a, 11b are mixedly formed, usual working for forming a corrugated metal sheet can be applied to the plane metal sheet material M.

Here, the features of the metallic catalyst carrier 10 will be summarized. The height and pitch of the corrugations are changed in the direction of from the region A to the region C, in which a change from the large corrugation 11a to the small corrugation 11b is made. At the region C, the flat metal sheet 12 is removed thereby lowering the heat capacity of the metallic catalyst carrier 10. At the region D, the additional corrugated metal sheets 14 having the small corrugations 11b and the additional flat metal sheet 12 are added thereby increasing the cell density so as to increase the surface area of the catalyst material to which exhaust gas is brought into contact.

With the thus arranged metallic catalyst carrier 10, the number of contact portions between the corrugated metal sheets 11 and the flat metal sheets 12 is decreased at the region B, and additionally the flat metal sheet 12 is removed at the region C. Therefore, a value of the surface area/the heat capacity and the heat capacity itself are improved in a front-generally half section (including the regions A, B and C) of the metallic catalyst carrier 10, so that the temperature of the front-generally half section can be raised to an activated temperature for a short time thereby promoting an early activation of the catalyst. The quantity of heat in the front-generally half section is transmitted to a rear-generally half section (or the region D) thereby promoting the activation of the rear-generally half section.

After the rear-generally half section is activated, a steady state conversion efficiency of exhaust gas is improved thereby effectively purifying exhaust gas, because the surface area of the catalyst material to which exhaust gas contacts is enlarged in the rear-generally half-section.

Furthermore, the sectional shape of the gas passage 13 changes in the direction of flow of exhaust gas, and therefore the dispersion characteristics of exhaust gas is improved allowing exhaust gas to be easily brought into contact with the catalyst material, thereby further promoting purification of exhaust gas. Additionally, since the cell density of the rear-generally half section of the metallic catalyst carrier 10 is increased, the rigidity of the metallic catalyst carrier 10 is improved, so that the thickness of the corrugated metal sheet 11 and the flat metal sheet 12 to be used can be decreased thereby largely suppressing an increase in weight and production cost of the metallic catalyst carrier 10.

Here, effects of early activation of the metallic catalyst carrier 10 will be discussed with reference to FIGS. 5 and 6.

Figure 5:
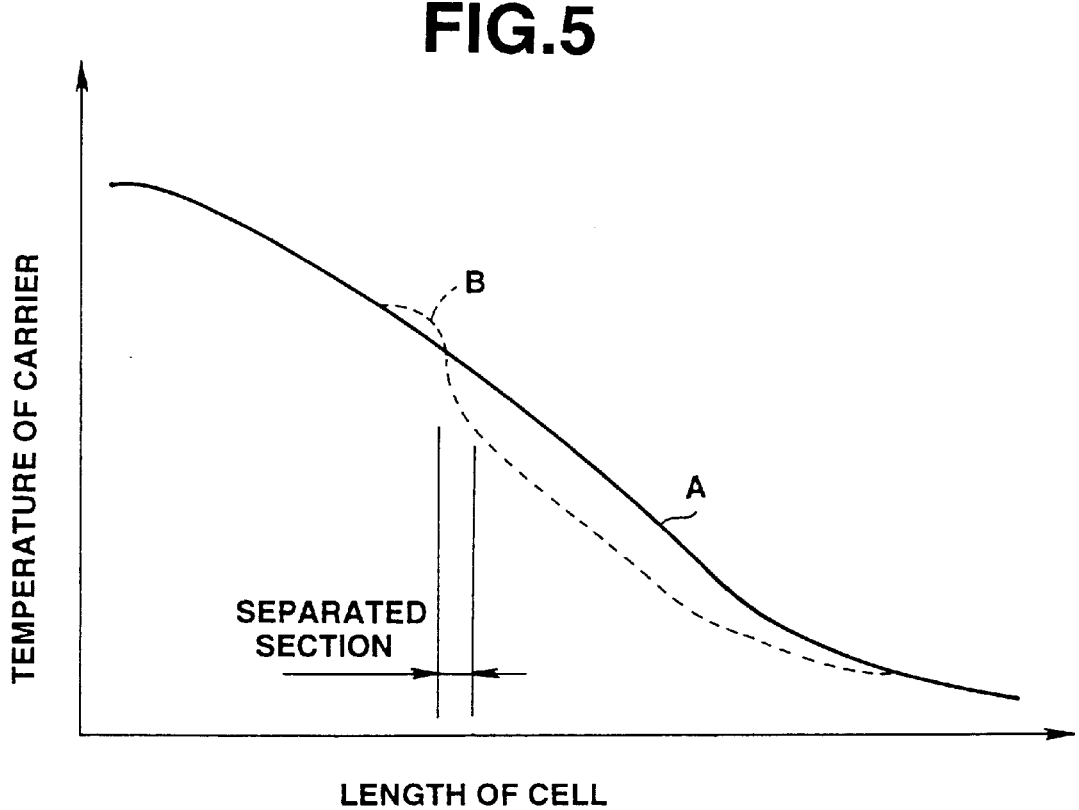
FIG. 5 is a graph showing experimental data of a temperature of the metallic catalyst carrier in terms of a length of cell in the carrier, in connection with the metallic catalyst carrier of FIG. 1.

FIG. 5 shows experimental data of the temperature distribution of the metallic catalyst carrier 10 in terms of the length of the cell (the gas passage 13) from the end face of the exhaust gas inlet G1 of the metallic catalyst carrier 10. In FIG. 5, a curve A indicates the data of a specimen metallic catalyst carrier in which the front-generally half section (low in heat capacity) and the rear-generally half section (high in cell density) were connected to each other with the corrugated metal sheets 11 like the above embodiment of the metallic catalyst carrier 10 according to the present invention, while a curve B indicates the data of another specimen metallic catalyst carrier in which the front-generally half section and the rear-generally half section are separate from each other. The experimental data were taken under a condition where a catalytic converter was disposed in an exhaust pipe of an internal combustion engine, in which the catalytic converter included the catalytic element having the above specimen metallic catalyst carrier carrying the catalyst material.

The data of FIG. 5 depicts the following facts: With the metallic catalyst carrier having the front- and rear-generally half sections which were separate from each other, the temperature of the metallic catalyst carrier was slightly higher than the metallic catalyst carrier of the embodiment of the present invention, at a portion immediately in front of a separated section. This is because the quantity of heat is difficult to be transmitted from the front-generally half section (the portion immediately in front of the separated section) to the rear-generally half section under a heat insulation effect of the separated section, so that the temperature of the metallic catalyst carrier cannot be lowered. However, in the rear-generally half section, the quantity of heat transmitted from the front-generally half section is small, and therefore the temperature of the metallic catalyst carrier is increased only with the quantity of heat of exhaust gas. As a result, the temperature of the metallic catalyst carrier having the front- and rear-generally half sections separate from each other is lowered relative to that of the metallic catalyst carrier of the embodiment of the present invention.

In other words, the metallic catalyst carrier of the embodiment of the present invention is high in temperature of the rear-generally half section and therefore short in time required to raise its temperature to a level of activation temperature as compared with the metallic catalyst carrier having front- and rear-generally half sections separate from each other, thereby exhibiting a high exhaust gas purifying ability.

Figure 6:
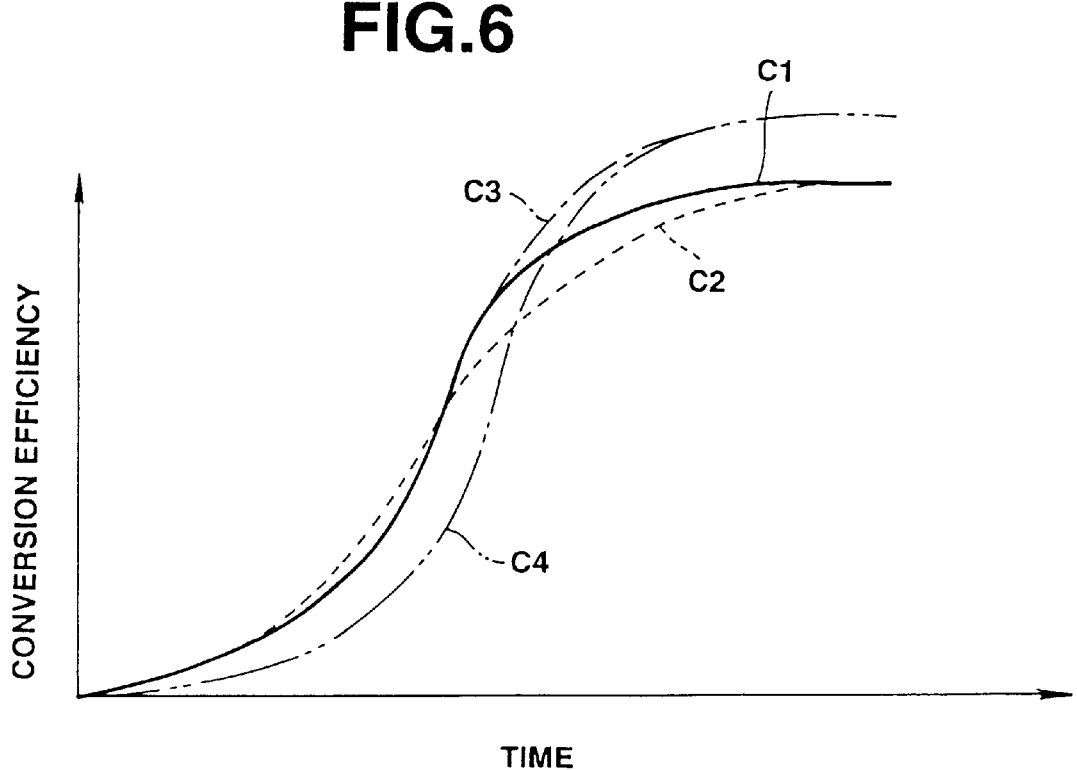
FIG. 6 is a graph showing experimental data of a conversion efficiency for exhaust gas noxious components in terms of a time lapsed since engine starting, in connection with the metallic catalyst carrier of FIG. 1.

FIG. 6 shows experimental data of the conversion efficiency of the catalyst material in terms of the time lapsed since starting of the internal combustion engine whose exhaust gas passage was provided with a catalytic converter having a metallic catalyst carrier (corresponding a specimen metallic catalyst carrier discussed below), at a time when the engine was started under a condition in which the metallic catalyst carrier was cold. The metallic catalyst carrier carried thereon the catalyst material. The conversion efficiency was a rate of an amount of exhaust gas noxious components which were converted into harmless gas, relative to an amount of exhaust gas noxious components before passing to the catalytic converter. In FIG. 6, curves C1 and C2 indicate respectively data of first and second specimen metallic catalyst carriers which were similar to the metallic catalyst carrier of the embodiment of the present invention with the exception that the front- and rear-generally half sections were the same in cell density. The first specimen metallic catalyst carrier had the front- and rear-generally half sections which were connected with each other. The second specimen metallic catalyst carrier had the front- and rear-generally half sections which were separate from each other. The cell density of the first and second specimen metallic catalyst carriers was lower than that of the metallic catalyst carrier of the embodiment of the present invention. A curve C3 indicates data of a third specimen metallic catalyst carrier corresponding to the embodiment of the present invention. A curve C4 indicates data of a fourth specimen metallic catalyst carrier similar to the metallic catalyst carrier of the embodiment of the present invention with the exception that the cell density of the front- and rear-generally half sections was higher than that of the metallic catalyst carrier of the embodiment of the present invention.

The data of FIG. 6 depicts the following facts: In case that the front- and rear-generally half sections were the same in cell density, early activation effect for the catalyst material was higher in the metallic catalyst carrier having the front- and rear-generally half sections which were connected with each other, than in the metallic catalyst carrier having the front- and rear-generally half sections which were separate from each other. However, even the metallic catalyst having the front- and rear-generally half sections which were connected with each other was inferior in conversion efficiency of the catalyst material after engine warming-up as compared with the embodiment of the present invention. This was because the cell density of the whole first specimen metallic catalyst carrier was lower than the metallic catalyst carrier of the embodiment of the present invention in order to accomplish activation of the catalyst at the similar speed to that of the metallic catalyst carrier of the embodiment of the present invention. Conversely, in case that the cell density of the whole metallic catalyst carrier was increased like the fourth specimen metallic catalyst carrier in order to improve the conversion efficiency after engine warming-up, activation of the catalyst was largely delayed.

In summary, according to the present invention, both early activation and high conversion efficiency of the catalyst material can be met by connecting the front-generally half section which is low in heat capacity, with the rear-generally half section which is high in cell density.

FIGS. 3E to 3H illustrate a modified example of the first embodiment metallic catalyst carrier 10, which is similar to the first embodiment catalyst carrier 10 with the exception that each gently corrugated metal sheet 12' is used in place of each flat metal sheet 12. FIGS. 3E to 3H corresponds respectively to FIGS. 3A to 3D of the fist embodiment. It will be understood that the gently corrugated metal sheet 12' is substantially flat as compared with each corrugated metal sheet 11. As a result, the metallic catalyst carrier of this modified example exhibits the advantageous effects as those of the first embodiment.

FIGS. 7 and 8A to 8C illustrate a second embodiment of the metallic catalyst carrier 10 according to the present invention, similar to the first embodiment metallic catalyst carrier 10.

Figure 7:
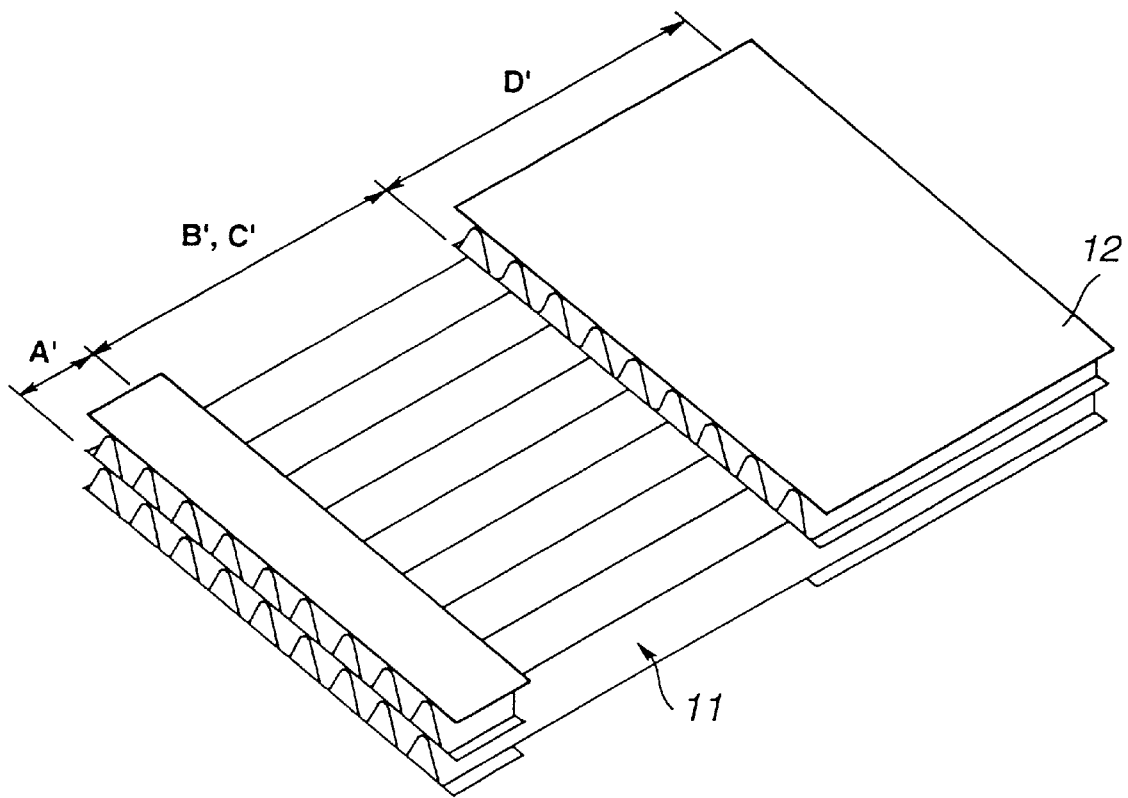
FIG. 7 is a fragmentary perspective view similar to FIG. 2 but showing a second embodiment of the metallic catalyst carrier according to the present invention, illustrating a state where each corrugated metal sheet and each flat metal sheet are put one upon another.

In this embodiment, each corrugated metal sheet 11 includes only the small corrugations 11b, and regions A', B', C' and D' are formed as shown in FIG. 7. Only at the region A' (corresponding to FIG. 8A) and the region D' (corresponding to FIG. 8C), the ridge portion R' of each small corrugation 11b of each corrugated metal sheet 11 is in contact with the flat metal sheet 12, in which the additional corrugated metal sheet 14 is provided between the adjacent corrugated metal sheets 11, 11 in such a manner that the ridge portions R" of the additional corrugated metal sheet 14 are located between and in contact with the adjacent flat metal sheets 12, 12. At the regions B' and C' (corresponding to FIG. 8B), the flat metal sheet 12 is removed so that the regions B' and C' are constituted only by the corrugated metal sheets 11.

Here, the length of the region A' is reduced as compared with that of the region D' in the direction of flow of exhaust gas through the gas passage 13. This is because the volume of the region A' which is the same in cell density as the region D is suppressed to be small thereby to minimize the heat capacity of the whole front-generally half section (including regions A', B' and C').

With the thus arranged second embodiment metallic catalyst carrier 10, the flat metal sheets 12 are removed from the regions B' and C' similarly to the first embodiment, and therefore the heat capacity of the front-generally half section (including regions A', B' and C') is lowered in association with the fact that the region A' is formed short, thereby promoting early activation of the front-generally half section. Additionally, since the heat quantity of the front-generally half section is transferred to the rear-generally half section (or the region D'), the activation of the rear-generally half section can be promoted.

Although it seem that the heat capacity is large in the region A' in this embodiment, the region B (serving as a transition section from the large corrugations 11a to the small corrugations 11b) in the first embodiment is not required, which contributes to lowering the heat capacity of the front-generally half section. Further, it is not required to form slits or cuts in a plane metal sheet material M (not shown) for the corrugated metal sheet 11, thereby increasing the rigidity of the metallic catalyst carrier 10.

Figure 8A:
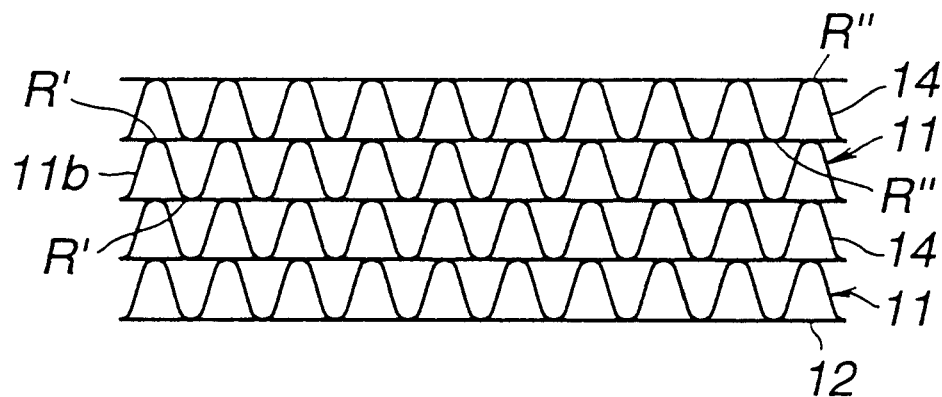
FIG. 8A is a fragmentary sectional view of a region A' in the metallic catalyst carrier in FIG. 7.
Figure 8B:
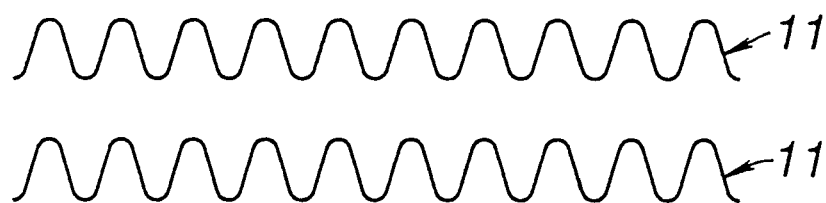
FIG. 8B is a fragmentary sectional view of a region B' and C' in the metallic catalyst carrier in FIG. 7.
Figure 8C:
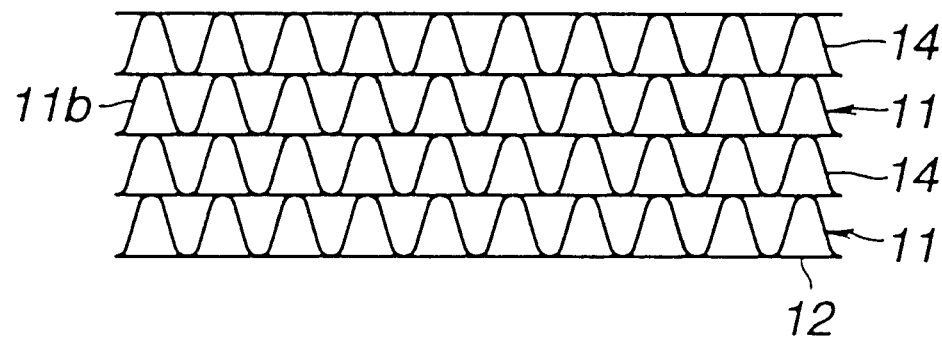
FIG. 8C is a fragmentary sectional view of a region D' in the metallic catalyst carrier in FIG. 7.
Figure 8D:
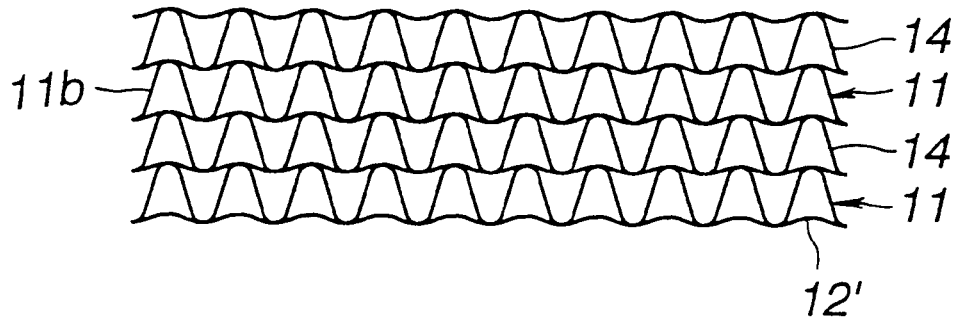
FIGS. 8D to 8F are fragmentary sectional views of a modified example of the second embodiment of FIG. 7, in which FIGS. 8D to 8F correspond respectively to FIGS. 8A to 8C of the second embodiment.
Figure 8E:
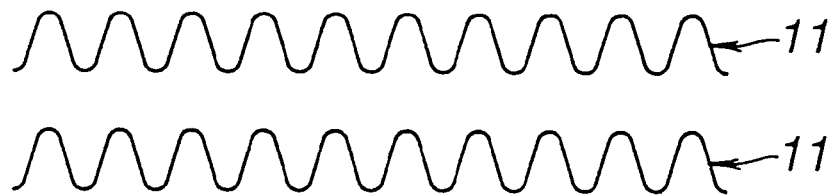
Figure 8F:
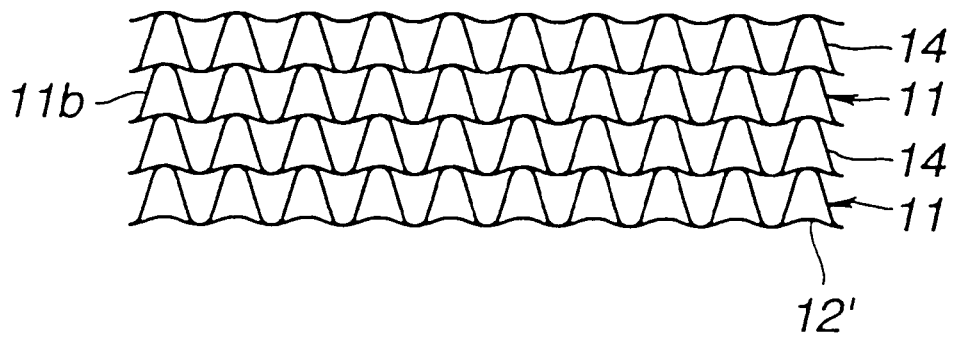

FIGS. 8D to 8F illustrate a modified example of the second embodiment metallic catalyst carrier 10, which is similar to the second embodiment catalyst carrier 10 with the exception that each gently corrugated metal sheet 12' is used in place of each flat metal sheet 12. FIGS. 8D to 8F correspond respectively to FIGS. 8A to 8C of the second embodiment. It will be understood that the gently corrugated metal sheet 12' is substantially flat as compared with each corrugated metal sheet 11. As a result, the metallic catalyst carrier 10 of this modified example exhibits the advantageous effects as those of the first embodiment.

Figure 9A:
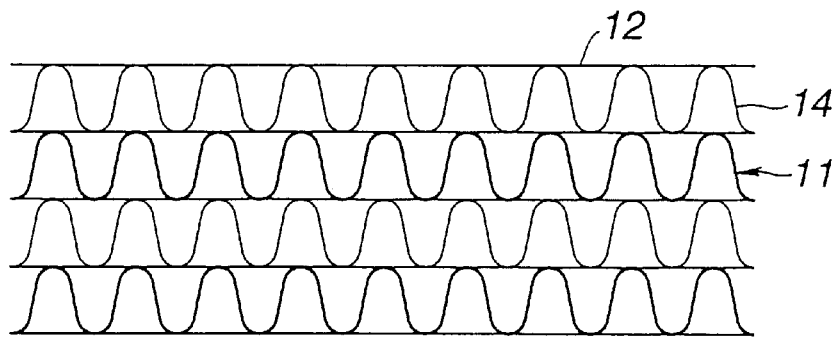
FIG. 9A is a fragmentary sectional view of a third embodiment of the metallic catalyst carrier according to the present invention, showing a region corresponding to the region D or D' of the first or second embodiment.

FIG. 9A illustrates a third embodiment of the metallic catalyst carrier 10, similar to the first and second embodiment metallic catalyst carrier 10. The third embodiment metallic catalyst carrier 10 includes first and second examples which are similar respectively to first and second embodiments with the exception that the thickness of the flat metal sheet 12 and the corrugated metal sheet 14 to be added to the rear-generally half section (or the region D or D') is reduced as compared with that of the corrugated metal sheet 11 which is used integrally throughout the whole length (in the exhaust gas flow direction) of the metallic catalyst carrier 10.

With the thus arranged third embodiment metallic catalyst carrier 10, the heat capacity of the rear-generally half section (or the region D or D') can be lowered without lowering the rigidity of the front-generally half section (including the regions A, B and C, or the regions A', B' and C') and without lowering the cell density of the rear-generally half section (or the region D or D'), thereby further promoting the activation of the rear-generally half section. This enables exhaust gas purification ability to be exhibited to the maximum level for a shorter time.

Additionally, in the second example of this embodiment, it will be understood that the thickness of the flat metal sheet 12 and the corrugated metal sheet 14 to be added in the region A in addition to in the rear-generally half section (or the region D or D') may be reduced as compared with that of the corrugated metal sheet 11 which is used integrally throughout the whole length of the metallic catalyst carrier 10. In this case, the heat capacity of the whole metallic catalyst carrier 10 is lowered thereby promoting early activation of the catalyst.

Figure 9B:
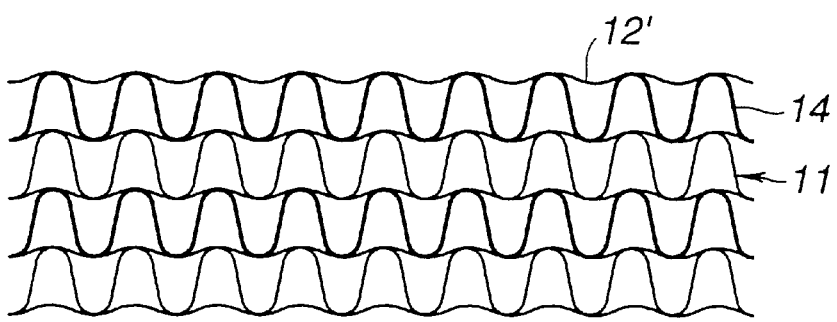
FIG. 9B is a fragmentary sectional view of a modified example of the third embodiment metallic catalyst carrier, showing a region corresponding to the region D or D' of the first or second embodiment.

FIG. 9B shows a modified example of the third embodiment metallic catalyst carrier 10, which is similar to the third embodiment catalyst carrier 10 with the exception that each gently corrugated metal sheet 12' is used in place of each flat metal sheet 12. In this embodiment, the thickness of each additional corrugated metal sheet 14 is larger than that of each corrugated metal sheet 11 and the gently corrugated metal sheet 12'. It will be understood that the gently corrugated metal sheet 12' is generally flat as compared with each corrugated metal sheet 11. As a result, the metallic catalyst carrier of this modified example exhibits the advantageous effects as those of the third embodiment.

Figure 10:
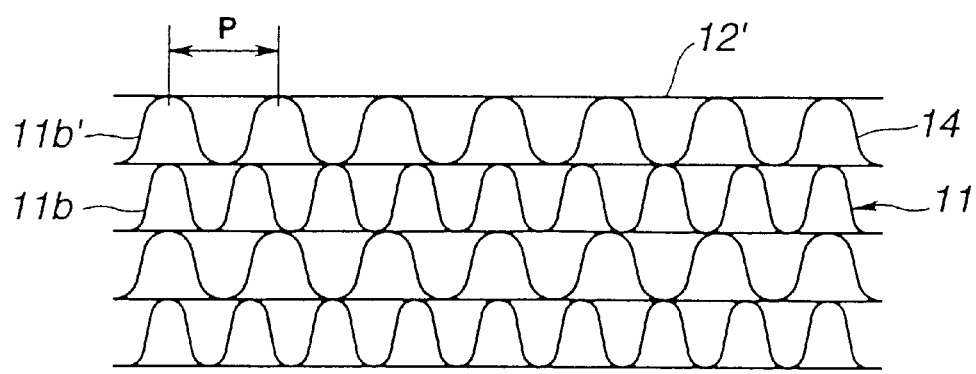
FIG. 10 is a fragmentary sectional view of a fourth embodiment of the metallic catalyst carrier according to the present invention, showing a region corresponding to the regions D and D' of the first and second embodiment.

FIG. 10 illustrates a fourth embodiment of the metallic catalyst carrier 10 according to the present invention. This fourth embodiment includes first and second examples which are similar respectively to the first and second embodiments with the exception that the pitch P of the small corrugations 11b' of the corrugated metal sheet 14 to be added in the rear-generally half section (or the region D) is increased as compared with the pitch P of the small corrugations 11b of the corrugated metal sheet 11. The pitch P of the small corrugations 11b' is set in accordance with the displacement, the power output characteristics and the like of the engine. In this case, the cell density of the rear-generally half section (or the region D or D') is higher than that of the front-generally half section (including the regions A, B and C, or the regions A', B' and C').

With the thus arranged fourth embodiment metallic catalyst carrier 10, gas flow resistance can be prevented from its excessive increase due to the increased cell density of the rear-generally half section, thereby avoiding an excessive increase in back pressure in an exhaust system of the engine thus to avoid engine power output lowering.

Figure 11:
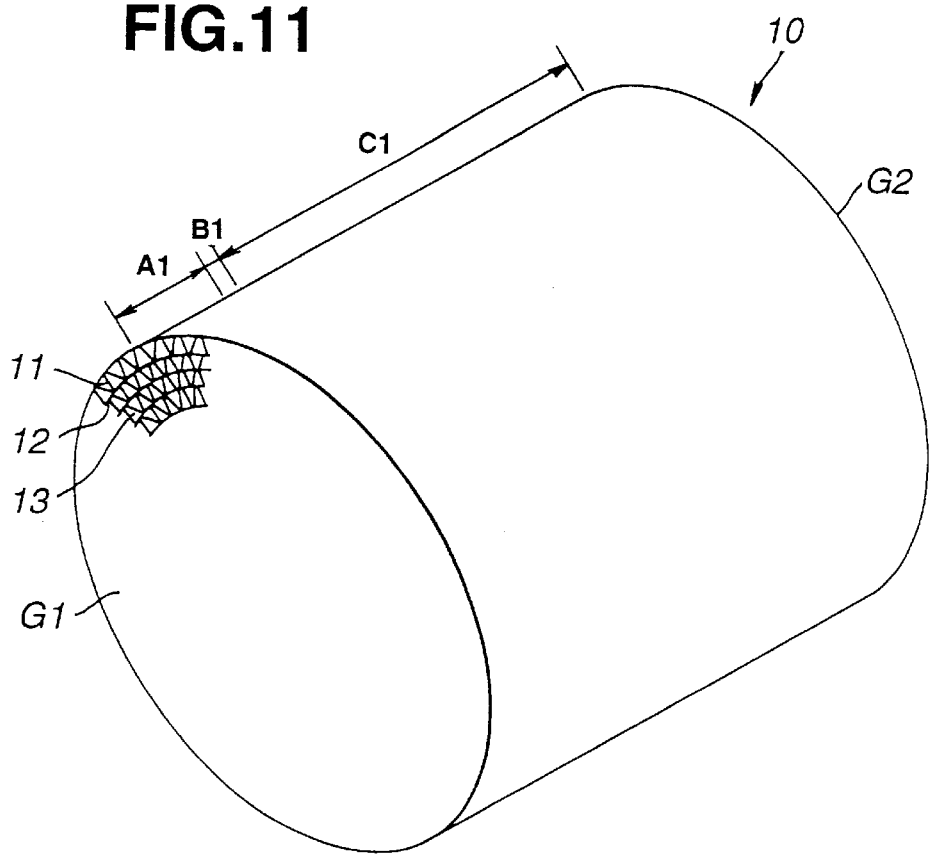
FIG. 11 is a fragmentary perspective view of a fifth embodiment of the metallic catalyst carrier according to the present invention.
Figure 12:
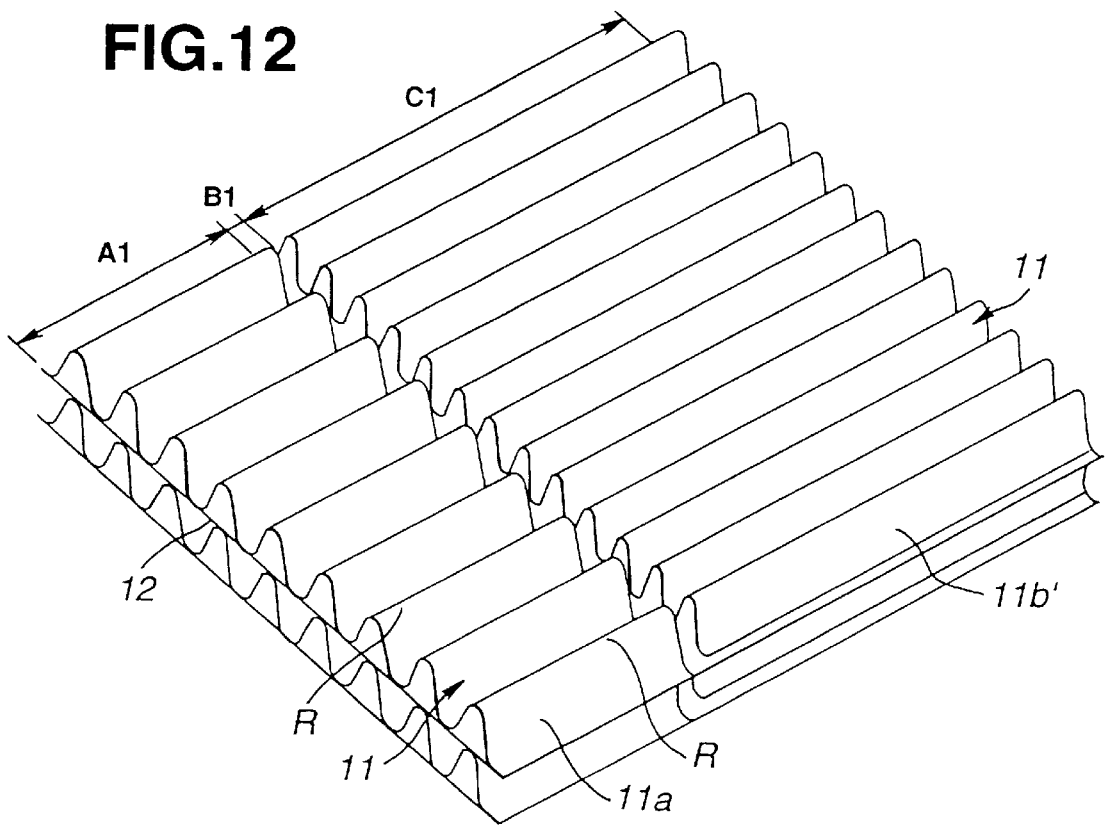
FIG. 12 is a fragmentary perspective view of the metallic catalyst carrier of FIG. 11, illustrating a state where each corrugated metal sheet and each flat metal sheet are put one upon another.
Figure 13A:
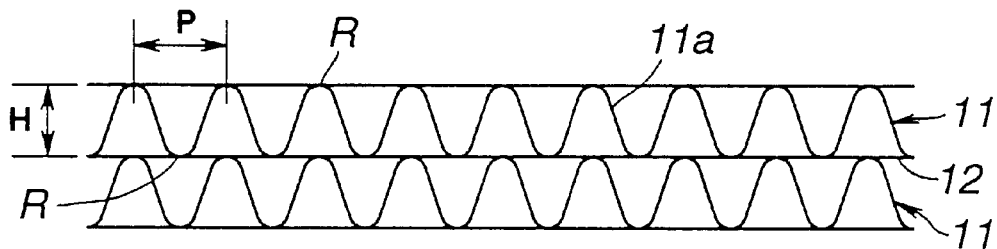
FIG. 13A is a fragmentary sectional view of a region A1 in the metallic catalyst carrier in FIG. 12.
Figure 13B:
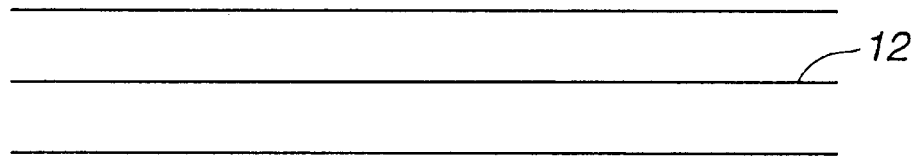
FIG. 13B is a fragmentary sectional view of a region B1 in the metallic catalyst carrier in FIG. 12.
Figure 13C:
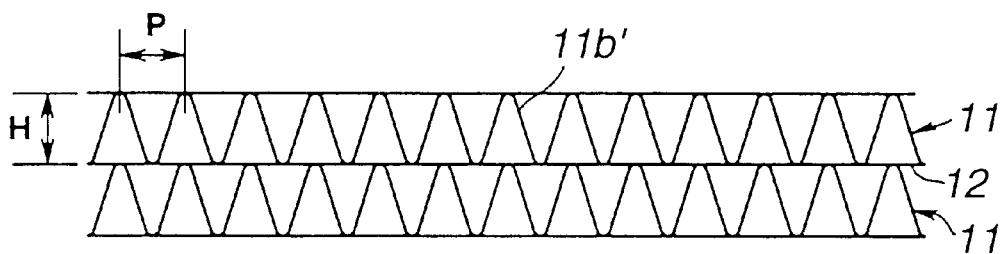
FIG. 13C is a fragmentary sectional view of a region C1 in the metallic catalyst carrier in FIG. 12.

FIGS. 11 to 13 illustrate a fifth embodiment of the metallic catalyst carrier 10 according to the present invention, which is similar to the first embodiment metallic catalyst carrier 10. In this embodiment, the flat metal sheets 12 are common and extend throughout the whole length of the metallic catalyst carrier 10 or throughout whole regions A1, B1 and C1.

At the region A1 (corresponding to FIG. 13A), the corrugated metal sheets 11 including the large corrugations 11a are disposed on and below each flat metal sheet 12 in such a manner that the ridge portion R of each large corrugation 11a is in contact with the flat metal sheet 12. At the region C1 (corresponding to FIG. 13C), the corrugated metal sheet 11 including the small corrugations 11b' are disposed on and below each flat metal sheet 12 in such a manner that the ridge portion of each small corrugation 11b' is in contact with the flat metal sheet 12. The small corrugations 11b' are smaller in their pitch P than the large corrugations 11a and the same in their height H as the large corrugations 11a. At the region B1 (corresponding to FIG. 13B) located between the regions A1 and C1, only the flat metal sheets 12 exist so that no corrugated metal sheets 11 exist. This region B1 functions to transfer the heat quantity of the front-generally half section to the rear-generally half section, while promoting dispersion of exhaust gas flowing from the front-generally half section to the rear-generally half section.

With the thus arranged fifth embodiment metallic catalyst carrier 10, the number of contact portions between the corrugated metal sheets 11 and the flat metal sheets 12 is reduced so as to lower the heat capacity of the front-generally half section, under the effect of employing in the front-generally half section the corrugated metal sheets 11 including the large corrugations 11a having the large pitch P. This can promote early activation of the front-generally half section. Additionally, the surface area of the catalyst material to which exhaust gas contacts is increased under the effect of employing in the rear-generally half section the corrugated metal sheets 11 including the small corrugations 11b' having the small pitch. This improves the conversion efficiency after activation of the catalyst. Furthermore, the heat quantity in the front-generally half section where early activation due to the decreased thermal capacity is made is transferred through the flat metal sheets 12 of the region B1 to the rear-generally half section, thereby making it possible to promote activation of the rear-generally half section.

Figure 14A:
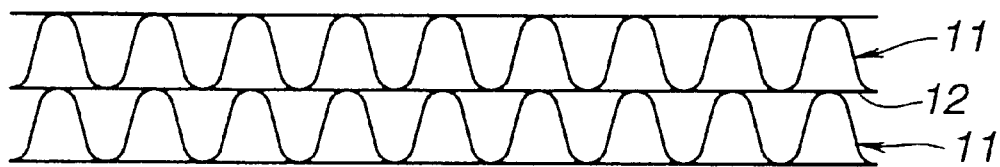
FIGS. 14A to 14C are fragmentary sectional views of a sixth embodiment of the metallic catalyst carrier according to the present invention, similar to the fifth embodiment, in which FIGS. 14A to 14C correspond respectively to FIGS. 13A to 13C of the fifth embodiment.
Figure 14B:
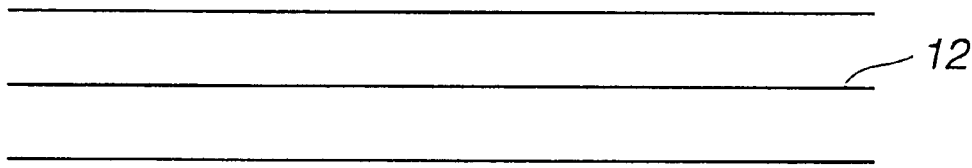
Figure 14C:
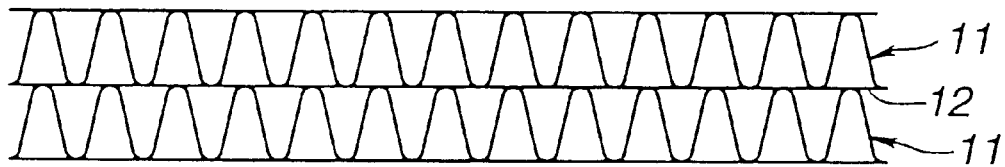

FIGS. 14A to 14C illustrate a sixth embodiment of the metallic catalyst carrier 10 according to the present invention, similar to the fifth embodiment metallic catalyst carrier 10 with the exception that the thickness of the corrugated metal sheets 11 in the rear-generally half section (or the region C1 in FIG. 12) is smaller than that of the corresponding corrugated metal sheets 11 in the fifth embodiment, as indicated in FIG. 14C corresponding to the region C1 in FIG. 12. It will be understood that FIGS. 14A and 14B completely correspond respectively to FIGS. 13A and 13B for the fifth embodiment.

With the thus arranged sixth embodiment metallic catalyst carrier 10, the heat capacity of the rear-generally half section can be reduced without lowering the cell density of the rear-generally half section, thereby achieving both early activation of the rear-generally half section and improvement in conversion efficiency of the catalyst after engine warming-up. Such thinning the corrugated metal sheets 11 in the rear-generally half section can be achieved under the effect of improvement in rigidity of the metallic catalyst carrier 20 owing to the fact that the pitch P of the corrugations of the corrugated metal sheet 11 is minimized so as to increase the cell density.

It will be understood that the thickness of the corrugated metal sheets 11 in the region A1 (in FIG. 12) may be also decreased in addition to that in the rear-generally half section. In this case, the heat capacity of the whole metallic catalyst carrier 10 is lowered thereby to promote early activation of the catalyst material.

What is claimed is:

1. A metallic catalyst carrier comprising:

a gas inlet section through which gas is introduced;

a gas outlet section through which the gas is discharged; and an intermediate section located between said gas inlet section and said gas outlet section;

wherein said gas inlet section includes a plurality of layers of flat metal sheet and a plurality of layers of corrugated metal sheet, each layer of the flat metal sheet and each layer of the corrugated metal sheet being alternately put one upon another so as to define a gas passage between the adjacent layers of the flat and corrugated metal sheets, wherein said gas outlet section includes a plurality of layers of flat metal sheet, and a plurality of layers of corrugated metal sheet, each layer of the flat metal sheet and each layer of the corrugated metal sheet being alternately put one upon another so as to define a gas passage between the adjacent layers of the flat and corrugated metal sheets, the layers of the flat and corrugated metal sheets in said gas outlet section being larger in number than those in said gas inlet section, wherein said intermediate section includes only a plurality of layers of corrugated metal sheet, the gas passage being defined between the adjacent layers of corrugated metal sheet, wherein each layer of the corrugated metal sheet in said gas inlet section has large corrugations, and each layer of the corrugated metal sheet in said gas outlet section has small corrugations which are smaller in height than each layer of the corrugated metal sheet in said gas inlet section, wherein said gas outlet section is higher in cross-sectional density of the gas passage than said gas inlet section, wherein the layers of the corrugated metal sheet in said gas outlet section include first layers of the corrugated metal sheet which layers are respectively connected to the layers of the corrugated metal sheet in said gas inlet section through the layers of the corrugated metal sheet in said intermediate section and layers of corrugated metal sheet which has large corrugations and small corrugations which are identical respectively with the large corrugations in said gas inlet section and the small corrugations in said gas outlet section so that said metallic catalyst carrier takes a monolithic structure, and second layers of the corrugated metal sheet which layers are spaced from the layers of the corrugated metal sheet in said gas inlet section, wherein each second layer of the corrugated metal sheet in said gas outlet section is smaller in sheet thickness than each layer of the corrugated metal sheet in said gas inlet section.

2. A metallic catalyst carrier as claimed in claim 1, wherein each small corrugation is smaller in pitch than each large corrugation.

3. A metallic catalyst carrier comprising:

a gas inlet section through which gas is introduced;

a gas outlet section through which the gas is discharged; and an intermediate section located between said gas inlet section and said gas outlet section;

wherein said gas inlet section includes a plurality of layers of flat metal sheet and a plurality of layers of corrugated metal sheet, each layer of the flat metal sheet and each layer of the corrugated metal sheet being alternately put one upon another so as to define a gas passage between the adjacent layers of the flat and corrugated metal sheets, wherein said gas outlet section includes a plurality of layers of flat metal sheet, and a plurality of layers of corrugated metal sheet, each layer of the flat metal sheet and each layer of the corrugated metal sheet being alternately put one upon another so as to define a gas passage between the adjacent layers of the flat and corrugated metal sheets, wherein said intermediate section includes only a plurality of layers of flat metal sheet the gas passage being defined between the adjacent layers of the flat metal sheet, wherein said gas outlet section is higher in cross-sectional density of the gas passage than said gas inlet section, wherein the layers of the flat metal sheet in said gas outlet section are respectively connected to the layers of the flat metal sheet in said gas inlet section through the layers of the flat metal sheet in said intermediate section so that said metallic catalyst carrier takes a monolithic structure, wherein each layer of the corrugated metal sheet in said gas outlet section is smaller in sheet thickness than each layer of the corrugated metal sheet in said gas inlet section.

4. A metallic catalyst carrier as claimed in claim 3, wherein each layer of the corrugated metal sheet in said gas outlet section has corrugations which are smaller in pitch than and generally equal in height to corrugations of each layer of the corrugated metal sheet in said gas inlet section.

* * * * *